Inventor
FRANK MAREK.
By Willard L. Grove
Attorney

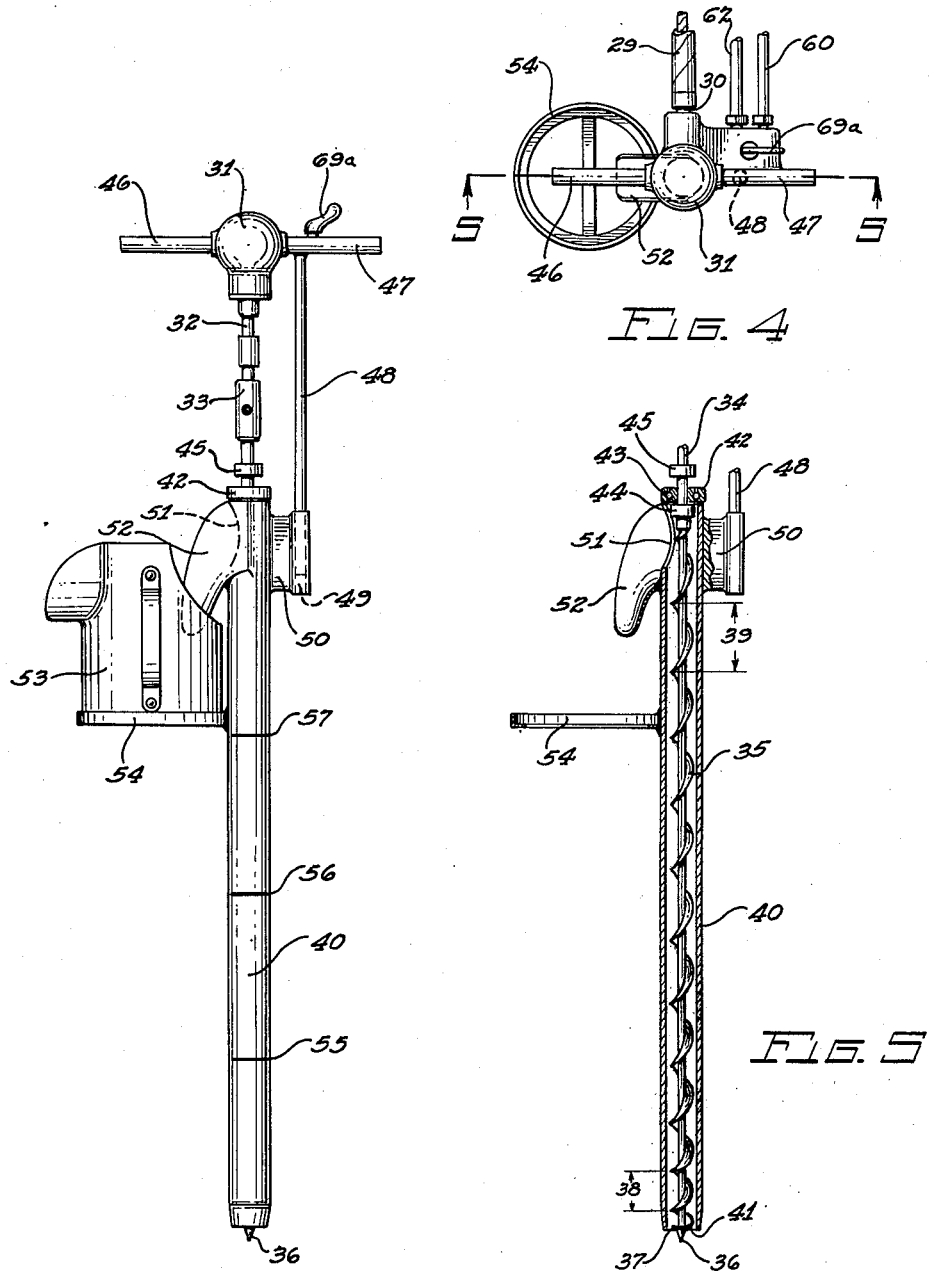

Patented Jan. 20, 1953

2,625,835

UNITED STATES PATENT OFFICE 2,625,835

DRIVE MECHANISM FOR SOIL SAMPLING APPARATUS

Frank Marek, Phoenix, Ariz.

Application February 20, 1950, Serial No. 145,154

3 Claims. (Cl. 74—472)

This invention pertains to improvements in soil sampling apparatus, and is more particularly directed to improvements in portable power drive mechanism for devices to be used in the field in sampling soil or the like.

One of the objects of this invention is to provide an improved power take off from a motor vehicle for driving soil sampling tools or other field equipment.

Another object of this invention is to provide an improved power drive transmission which receives its power from an internal combustion engine of a vehicle.

Still another object of this invention is to provide an improved power take off mechanism from the prime mover of a motor vehicle which simultaneously regulates the connection and disconnection of the power from the motor and at the same time adjusts the motor to a predetermined speed of operation.

It is also an object of this invention to provide an improved soil sampling drilling mechanism and a power transmission for actuating the drill from the internal combustion engine of a motor vehicle.

Further features and advantages of this invention will appear from a detailed description of the drawings in which:

Figure 3 is an elevational view of a preferred form of soil sampling drill for use with the power transmissions of Figures 1 and 2.

Figure 4 is a plan view of the soil sampling drill of Figure 3.

Figure 5 is a sectional view on the line 5—5 of Figure 4.

Figure 1:
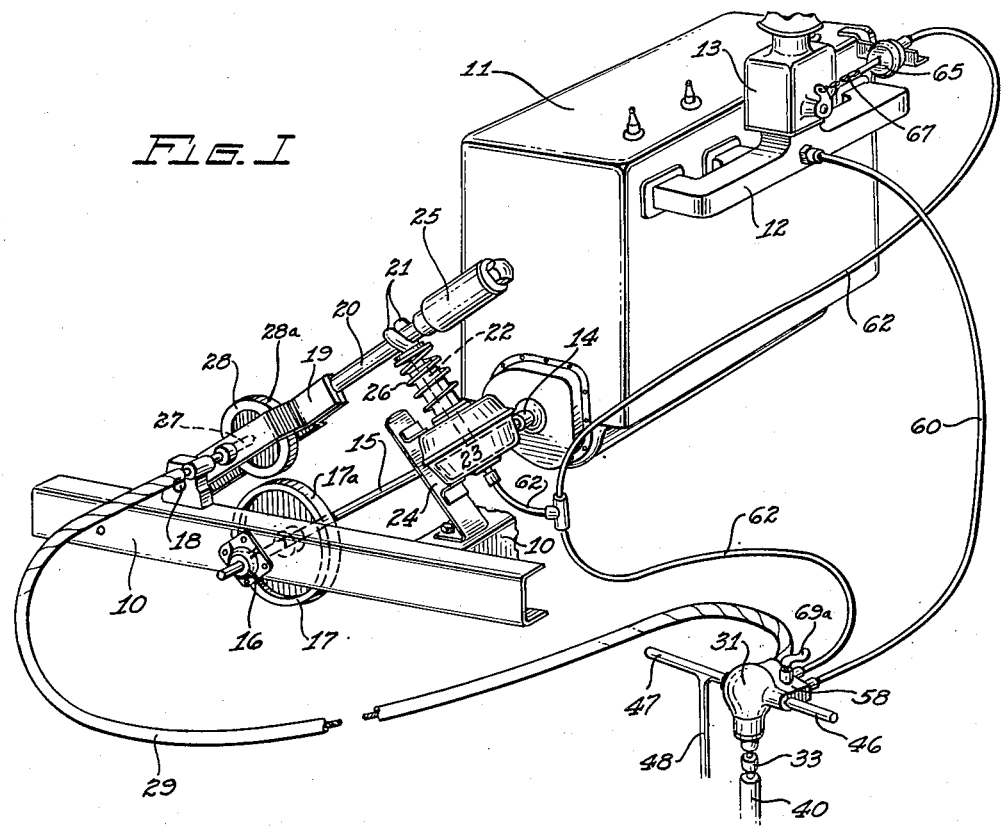
Figure 1 is a perspective view of the power take off mechanism incorporating the features of this invention.

For exemplary purposes this invention is shown applied to a motor vehicle having a frame or bumper 10 and an internal combustion engine 11 having the usual manifold 12 and carburetor 13. Power take off is obtained from the front or stub end of the crankshaft at 14 to which is appropriately connected a drive shaft 15 supported in a suitable manner in journal bearings 16 carried on the frame 10 of the vehicle. Fixed rigidly to the shaft 15 and to be driven thereby is the driving wheel 17.

Mounted on a suitable trunnion bearing 18 carried on the frame 10 of the vehicle, is the swinging lever arm 19 having a bar member 20 which is carried in the forked end 21 of the actuating piston rod 22 of the vacuum cylinder 23, this cylinder in turn being carried on a suitable bracket 24 fixed to the frame 10 of the vehicle. A suitable counter-weight 25 fixed to the outer end of the bar member 20 serves to hold the swinging lever arm 19 in the forked portion 21 of the piston rod 22. A compression spring 26 serves to normally hold the piston rod 22 in extended position.

Fixed on a shaft 27 journaled in the swinging lever arm 19 is the driven wheel 28, which preferably has a composition or rubber tire 28a fixed on its periphery for engagement with the periphery 17a of the driving wheel 17. A flexible power transmission shaft 29 is connected to the driven shaft 27 for conveying power to the device to be actuated.

As exemplary of a device to be driven by the flexible shaft 29 there is shown a soil drill or soil sampling apparatus as best seen in Figures 3, 4, and 5. The flexible shaft 29 is connected to the in-put drive shaft 30 carried in the right angle drive box 31 of the soil sampling drill and through suitable gearing in this box 31 (not shown) power is transmitted out through the output shaft 32 which is connected by a suitable coupling 33 to the soil drilling auger shaft 34 of the drilling auger 35. The auger 35 has the usual guide point 36 and the cutting edges 37 and in this arrangement the lead or distance between the scrolls is closer at 38 than at 39 at the top portion of the auger.

The auger 35 is surrounded by the tube 40 which is tapered at 41 to a sharp cutting edge so that it may follow and sink down through the soil as the auger 35 is rotated. On the upper portion of the tube 40 is rigidly secured the outer race 42 of a thrust bearing 43 whose inner race is allowed limited axial movement between the stop collars 44 and 45 rigidly fixed to the shaft 34 of the auger 35. This allows the tube 40 to be shifted relative to the auger 35 during the drilling operation and when removing the last vestiges of the soil sample after the drill has been removed from the ground surface. To further facilitate this operation the auger in addition to having a closer pitch 38 at the bottom than 39 at the top, is also made tapered with a closer fit of the scroll of the auger in the bottom of the tube 40 than in the upper portions of the tube. This facilitates easy removal of the soil as it is worked up through the tube without jamming or packing, especially when the soil is in a moist or muddy condition.

Means are provided to prevent the tube 40 from being rotated with the auger 35 during the soil drilling operation. Fixed to the right angle drive gear box 31 are the control handles 46 and 47 which are grasped by the operator during the drilling procedure. Rigidly fixed to the handle 47 is the downwardly extending torque bar 48 which slidingly engages in a bore 49 formed in the bracket 50 fixed to the tube 40. This keeps the tube 40 from rotating with the auger 35 while at the same time allowing limited up and down movement of the auger in the tube 40 by appropriate manipulation of the control handles 46 and 47 in upward and downward movement during the drilling operation.

Soil is discharged from the tube 40 through the cut away opening 51 formed in the side of the tube 40 at its upper end just below the bearing 43. A suitable spout 52 conveys the soil sample into a suitable pitcher receptacle 53 which is carried on a suitable support 54 rigidly fixed to the tube 40. The outside diameter of the tube 40 may be graduated or otherwise marked at 55, 56 and 57 to correspond with each foot or other interval of depth it is desired to make the soil sample.

Figure 2:
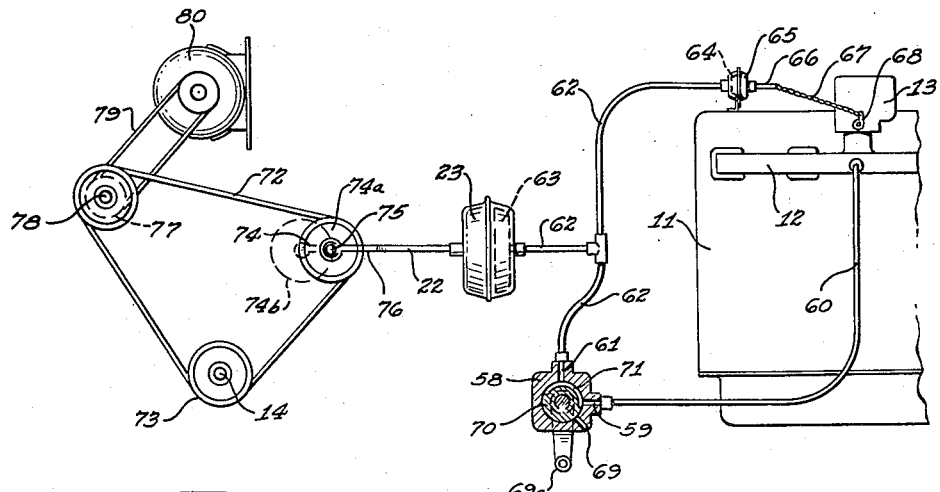
Figure 2 is a diagrammatic view showing a modification of the drive mechanism of Figure 1.

Associated with the control handles 46 and 47 and preferably fixed to the right angle drive gear box 31 is the control means 58 comprising, in the exemplary arrangement of Figure 1, a two way air valve shown in detail in Figure 2. This valve has a suction exhaust port 59 connected through a suitable line 60 to the intake manifold 12 of the internal combustion engine. An intake vacuum port 61 of the valve is connected through a line 62 to the vacuum chamber 63 of the cylinder 23 and to the vacuum chamber 64 of a vacuum cylinder 65 suitably fixed on the engine 11. The vacuum cylinder 65 has its actuating piston rod 66 connected through suitable linkage 67 to the throttle control lever 68 of the carburetor 13. The control valve also has an exhaust port 69 which connects to atmosphere.

In operating the device the internal combustion engine 11 of the vehicle is ordinarily operating at its low idling speed. The operator then moves the control valve lever 69a so as to position the valve control plunger 70 in the position with the passageway 71 so located as to connect the vacuum line 60 from the intake manifold to the line 62. This causes both of the vacuum cylinders 63 and 64 to be actuated simultaneously. When the vacuum cylinder 23 is thus actuated its piston rod 22 is pulled inwardly to cause the fort portion 21 to be withdrawn downwardly allowing the driven wheel 28 to engage the driving wheel 17 to begin and cause the drive to be transmitted to the flexible shaft 29. At the same time actuation of the vacuum cylinders 65 causes the carburetor to be open to a predetermined proper operating speed for the apparatus being driven. When the operator wishes to stop the operation he rotates the control lever 69a of the valve so as to connect the passageway 71 between the exhaust opening 69 and the line 62 so as to allow atmospheric pressure to again fill the vacuum chambers behind the cylinders 23 and 65. This lifts the driven wheel 28 from the driving wheel 17 and simultaneously closes the carburetor to normal idling position. Thus in this apparatus whenever the device is to be actuated the power drive is connected and the motor speed automatically advanced to the desired operating rate. When the device is to be rendered inoperative, the drive is simultaneously disconnected at the same time the motor speed is reduced back to idling speed.

In Figure 2 is shown an alternative form of drive mechanism in which a V-belt 72 is substituted instead of the driving wheel 17 and driven wheel 28. In this case the power take off from the crankshaft 14 is derived from a pulley 73 fixed to this crankshaft 14 over which passes the belt 72. The belt in turn also passes over the movable pulley 74 journaled on a suitable shaft 75 carried on the outer forked end 76 of the piston rod 22 of the vacuum cylinder 23. Thus actuation of the cylinder 23 causes the pulley 74 to be moved to the position 74a to tighten the belt 72 or move to disengaged position 74b to stop the drive, the carburetor actuation being in the same timed simultaneous relationship as in the arrangement of Figure 1. The belt 72 may be applied over a suitable driven pulley 77 carried on a suitable shaft 78 suitably journaled on the vehicle frame and a further take off drive from the shaft 78 through a suitable V-belt drive 79 to a member or generator 80 provides means for obtaining electrical power or any other form of power desired for operating the various earth working or other tools in the field from the motor vehicle transmission.

Having thus fully set forth and describing this invention what is claimed as new is:

1. A soil sampling apparatus adapted for use with a motor vehicle having an internal combustion engine including a crankshaft, and intake manifold, and a carburetor, a driving wheel connected to be rotated by said crankshaft, a driven wheel movably mounted to be engaged with or disengaged from said driving wheel, a vacuum cylinder connected to move said driven wheel, a second vacuum cylinder connected to adjust said carburetor, and a common control valve adapted to simultaneously connect said cylinders to the manifold vacuum or to atmosphere to vary the speed of the motor in regard to the engagement or disengagement of the driving and driven wheels.

2. A portable power transmission for soil sampling apparatus or the like including a motor vehicle having an internal combustion engine, a crankshaft, an intake manifold, and a carburetor associated with said motor, a driving shaft connected to said engine crankshaft, a driving wheel fixed on said driving shaft, a driven shaft movable relative to said driving shaft, a driven wheel fixed on said driven shaft adapted to engage said driving wheel, a vacuum power cylinder connected to move said driven shaft and wheel, a second vacuum power cylinder connected to adjust said carburetor, means for connecting both of said cylinders to said manifold including a two-way control valve arranged to be operated to effect simultaneous operation of said power cylinders to engage said wheels and increase the speed of the engine to a predetermined value or to disengage said wheels and return the engine to idling speed.

3. A portable power transmission for soil sampling apparatus or the like including a motor vehicle having an internal combustion engine, a crankshaft, an intake manifold, and a carburetor associated with said motor, a driving shaft connected to said engine crankshaft, a driving wheel fixed on said driving shaft, a driven shaft movable relative to said driving shaft, a driven wheel fixed on said driven shaft adapted to engage said driving wheel, a vacuum power cylinder connected to move said driven shaft and wheel, a second vacuum power cylinder connected to adjust said carburetor, means for connecting both of said cylinders to said manifold including a two-way control valve arranged to be operated to effect simultaneous operation of said cylinders to engage said wheels and increase the speed of the engine to a predetermined value or to disengage said wheels and return the engine to idling speed, a power tool connected to be driven by said driven shaft, and means for mounting said control valve on the operating handle of said power tool.

FRANK MAREK.

REFERENCES CITED

The following references are of record in the file of this patent:

UNITED STATES PATENTS

| Number | Name | Date |
|---|---|---|
| 596,281 | Spaulding | Dec. 28, 1897 |
| 1,367,306 | De Brun | Feb. 1, 1921 |
| 2,392,683 | McWhorter | Jan. 8, 1946 |
| 2,447,730 | Britton | Aug. 24, 1948 |
| 2,511,508 | McClinton | June 13, 1950 |
| 2,568,958 | Hey et al. | Sept. 25, 1951 |